(12) United States Patent
Hinotu et al.

(10) Patent No.: US 6,399,244 B1
(45) Date of Patent: Jun. 4, 2002

(54) HERMETICALLY SEALED RECTANGULAR BATTERY

(75) Inventors: Naoyoshi Hinotu, Itano-Gun; Takeo Hamamatsu, Tokushima; Hiroki Ochi, Naruto, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/537,392

(22) Filed: Mar. 29, 2000

(30) Foreign Application Priority Data

Mar. 29, 1999 (JP) ............................................. 11-086812

(51) Int. Cl.⁷ ............................. H01M 2/30; H01M 2/08
(52) U.S. Cl. ...................... 429/179; 429/175; 429/178; 429/181
(58) Field of Search ................................ 429/178, 181, 429/175, 179, 176

(56) References Cited

U.S. PATENT DOCUMENTS 4,435,486 A * 3/1984 Pomaro et al. ......... 429/176 X
4,693,949 A * 9/1987 Kellett et al. ................ 429/178
6,001,506 A * 12/1999 Timmons et al. ........... 429/178

* cited by examiner

Primary Examiner—John S. Maples
(74) Attorney, Agent, or Firm—Nixon & Vanderhye PC

(57) ABSTRACT

An object of the invention is to provide a hermetically sealed rectangular battery which is not liable to melting of gasket during laser welding causing the deterioration of the battery airtightness as well as to occurrence of electrolyte leakage and accomplish further reduction of the thickness of the hermetically sealed rectangular battery. A hermetically sealed rectangular battery comprising a group of electrode plates received in a metallic can having a pair of opposing wide sides and a pair of opposing narrow sides, the group of electrode plates having a positive electrode plate and a negative electrode plate laminated on each other with a separator provided interposed therebetween, characterized in that the metallic can is provided with a terminal which also acts as an electrode of one of the two polarities on the wide side thereof.

21 Claims, 3 Drawing Sheets

HERMETICALLY SEALED RECTANGULAR BATTERY

BACKGROUND OF THE INVENTION

1. Field of the Invention

The present invention relates to a hermetically sealed rectangular battery having a metallic can such as alkaline storage battery. More particularly, the present invention relates to a laser welding-sealed type hermetically sealed rectangular battery.

2. Description of the Related Art

In recent years, there has been a remarkable development of portable apparatus using battery. Video camera, portable telephone, etc. have been aggressively marketed. The batteries to be used as power supply for driving these apparatus are facing demand for higher capacity, smaller size and lighter weight. In order to meet these demands, small-sized hermetically sealed rectangular batteries having a rectangular can instead of cylindrical can have been used more and more for the purpose of reducing the battery size and hence saving the battery space.

As shown in FIG. 4, such a hermetically sealed rectangular battery is normally prepared by a process which comprises receiving a group of electrode plates having a positive electrode plate and a negative electrode plate laminated on each other with a separator provided interposed therebetween in a metallic can having an upper side, a bottom, a pair of opposing wide sides and a pair of opposing narrow sides in such an arrangement that the direction of lamination of the group of electrode plates is perpendicular to the wide side of the metallic can, injecting an electrolytic solution into the metallic can, placing a sealing plate 1 provided with a positive electrode terminal 2 as shown in FIG. 5 on an opening formed in the upper side of the rectangular can, and then laser-welding the sealing plate 1 to the rectangular can.

FIG. 5 generally illustrates a sealing body 10 provided with a conventional positive electrode terminal. The reference numeral 1 indicates a sealing plate, the reference numeral 2 indicates a positive electrode terminal, the reference numeral 3 indicates a gasket, and the reference numeral 4 indicates a laser-welded portion.

However, the sealing plate 1 provided with one of the two polarities as shown in FIG. 5 is disadvantageous in that the distance between the laser-welded portion 4 and the gasket 3 is so small that the gasket can be melted during laser welding, causing the deterioration of the airtightness of the battery resulting in easy occurrence of electrolyte leakage. In particular, under the present status of quo that there is a growing demand for the reduction of the thickness of such a type of rectangular battery, the distance between the laser-welded portion 4 and the gasket 3 cannot be increased in an attempt to prevent the gasket from being melted during laser welding. Further, further reduction of the thickness of such a type of rectangular battery is limited.

SUMMARY OF THE INVENTION

The present invention has been worked out in the light of the foregoing problems. An object of the invention is to provide a hermetically sealed rectangular battery which is little liable to melting of gasket during laser welding causing the deterioration of the airtightness of the battery as well as to occurrence of electrolyte leakage and accomplish further reduction of the thickness of such a hermetically-sealed rectangular battery.

Namely, a first aspect of the battery is a hermetically sealed rectangular battery, which comprises a group of electrode plates received in a metallic can having a pair of opposing wide sides and a pair of opposing narrow sides, said group of electrode plates having a positive electrode plate and a negative electrode plate laminated on each other with a separator provided interposed therebetween, wherein said metallic can is provided with a terminal which connects with an electrode plate of said positive electrode plate and negative electrode plate on the wide side thereof.

A second aspect of the battery is a hermetically sealed rectangular battery according to the first aspect, wherein the terminal is mounted on a sealing plate of said metallic can.

A third aspect of the battery is a hermetically sealed rectangular battery, according to the second aspect, wherein the terminal is mounted through a gasket on the sealing plate, and said metallic can is connected with other one electrode plate of said positive electrode and negative electrode.

A fourth aspect of the battery is a hermetically sealed rectangular battery, according to the second aspect, wherein the sealing plate is mounted on a recess formed on the wide side of said metallic can.

A fifth aspect of the battery is a hermetically sealed rectangular battery, according to the second aspect, wherein the sealing plate comprises:

- a main sealing body portion mounted on the wide side of said metallic can so as to be in parallel with the wide side, on which the terminal is mounted on a recess formed on the wide side of said metallic can;
- a first sealing portion extended from one side of the main sealing body portion so as to be folded in a perpendicular direction to the main sealing body portion; and
- a second sealing portion extended from one side facing to said side of the main sealing body portion so as to be folded in an opposite direction to said direction to the main sealing body portion, and
- free ends of said main sealing body portion, said first sealing portion and said second sealing portion are sealed with said metallic can.

A sixth aspect of the battery is a hermetically sealed rectangular battery, according to the fifth aspect, wherein said sealing plate and said metallic can are sealed with each other by laser welding.

A seventh aspect of the battery is a hermetically sealed rectangular battery, according to the second aspect, wherein said hermetically sealed rectangular battery is a hermetically sealed rectangular alkali storage battery.

An eighth aspect of the battery is a hermetically sealed rectangular battery, according to the seventh aspect, wherein said hermetically sealed rectangular battery is a hermetically sealed rectangular nickel-hydrogen storage battery.

A ninth aspect of the battery is a hermetically sealed rectangular battery, according to the seventh aspect, wherein said hermetically sealed rectangular battery is a hermetically sealed rectangular nickel-cadmium storage battery.

A tenth aspect of the battery is a hermetically sealed rectangular battery, according to the second aspect, wherein said hermetically sealed rectangular battery is a hermetically sealed rectangular lithium battery.

A eleventh aspect of the battery is a hermetically sealed rectangular battery, according to the second aspect, wherein said hermetically sealed rectangular battery is a hermetically sealed rectangular lithium ion secondary battery.

The hermetically sealed rectangular battery of the invention comprises a group of electrode plates received in a metallic can having a pair of opposing wide sides and a pair of opposing narrow sides, the group of electrode plates having a positive electrode plate and a negative electrode plate laminated on each other with a separator provided interposed therebetween, characterized in that the metallic can is provided with a terminal which also acts as an electrode of one of the two polarities disposed on the wide side thereof.

DESCRIPTION OF THE PREFERRED EMBODIMENT

The present invention will be further described in the following examples, but the present invention should not be construed as being limited thereto and proper modification and variation thereof may be made so far as the essence thereof is not changed.

EXAMPLE 1

Figure 1:
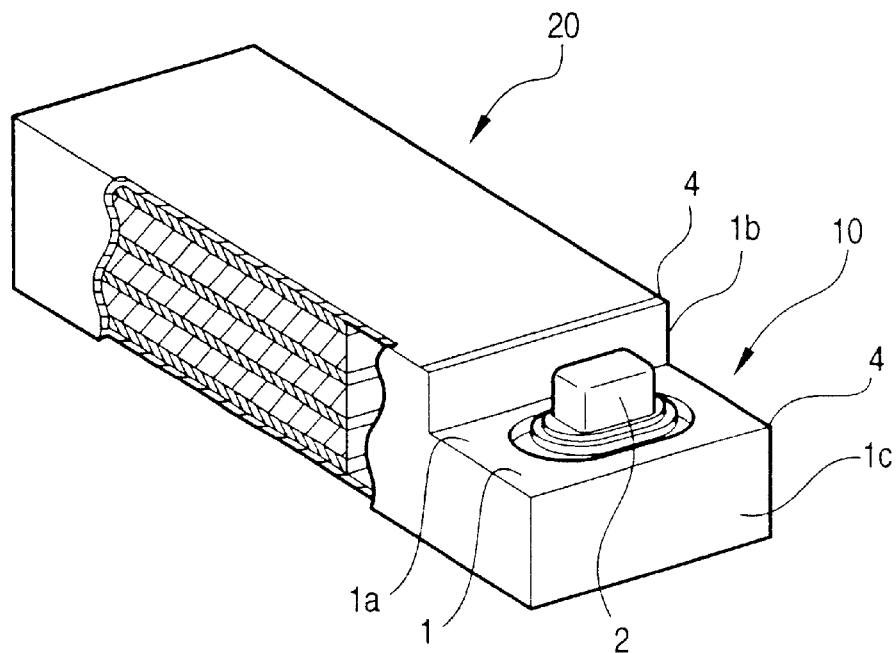
FIG. 1 illustrates a rectangular battery of the embodiment of the present invention.
Figure 2:
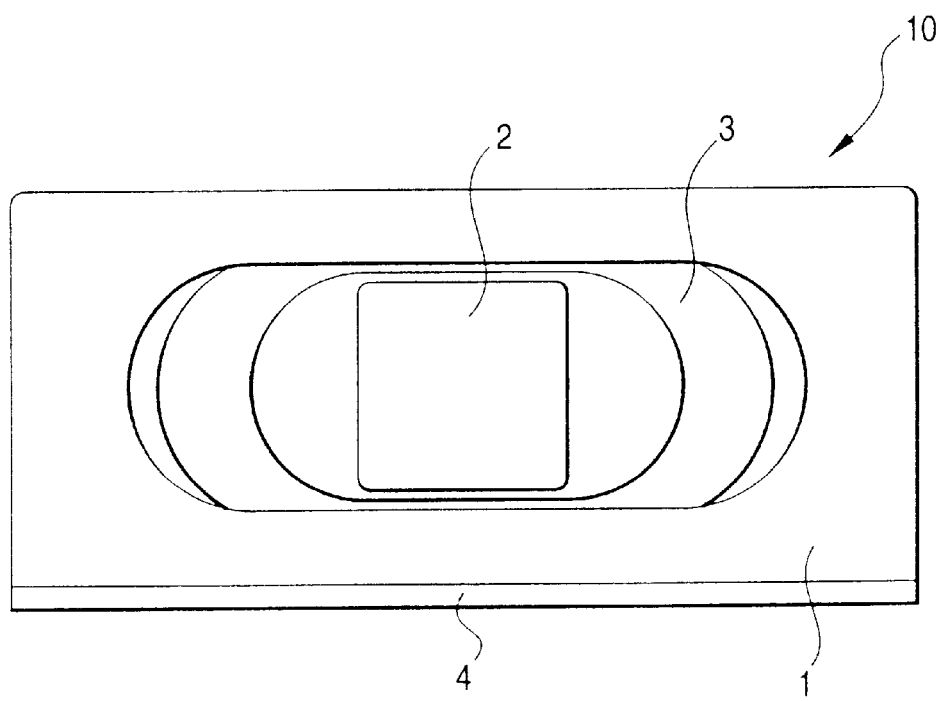
FIG. 2 illustrates a sealing plate used in the rectangular battery of the invention.
Figure 3:
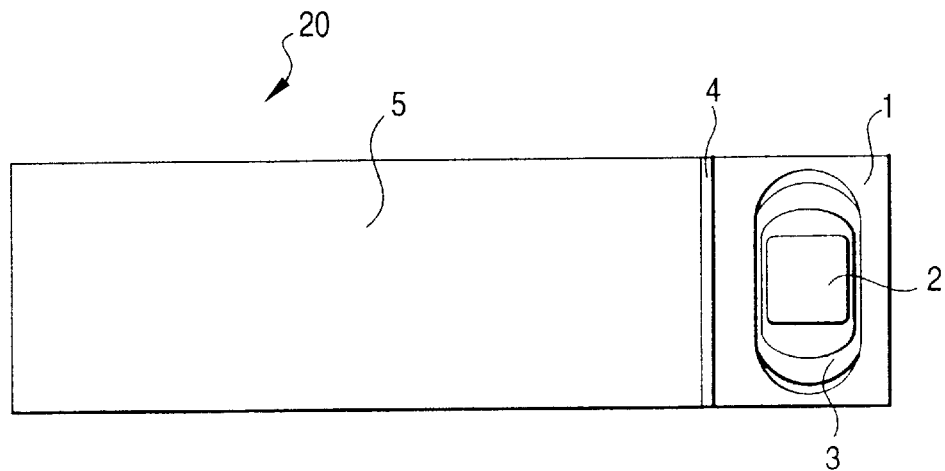
FIGS. 3(a) and 3(b) are front and longitudinal views of the rectangular battery of the invention, respectively.
Figure 3:
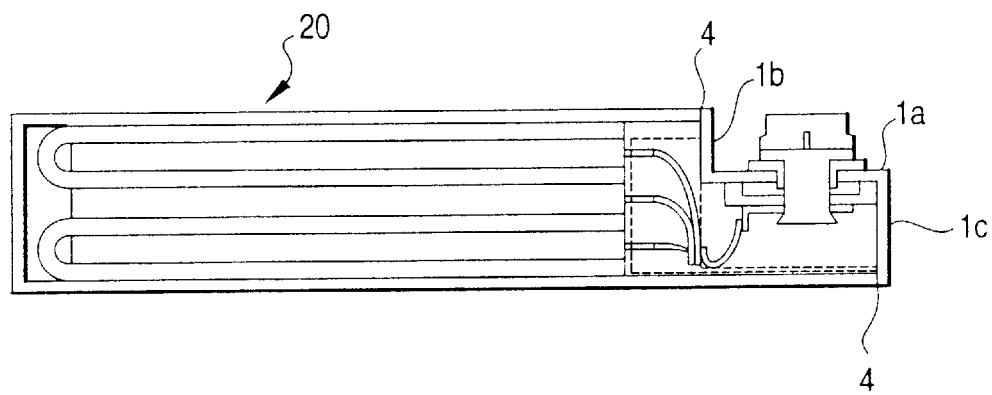
Figure 4:
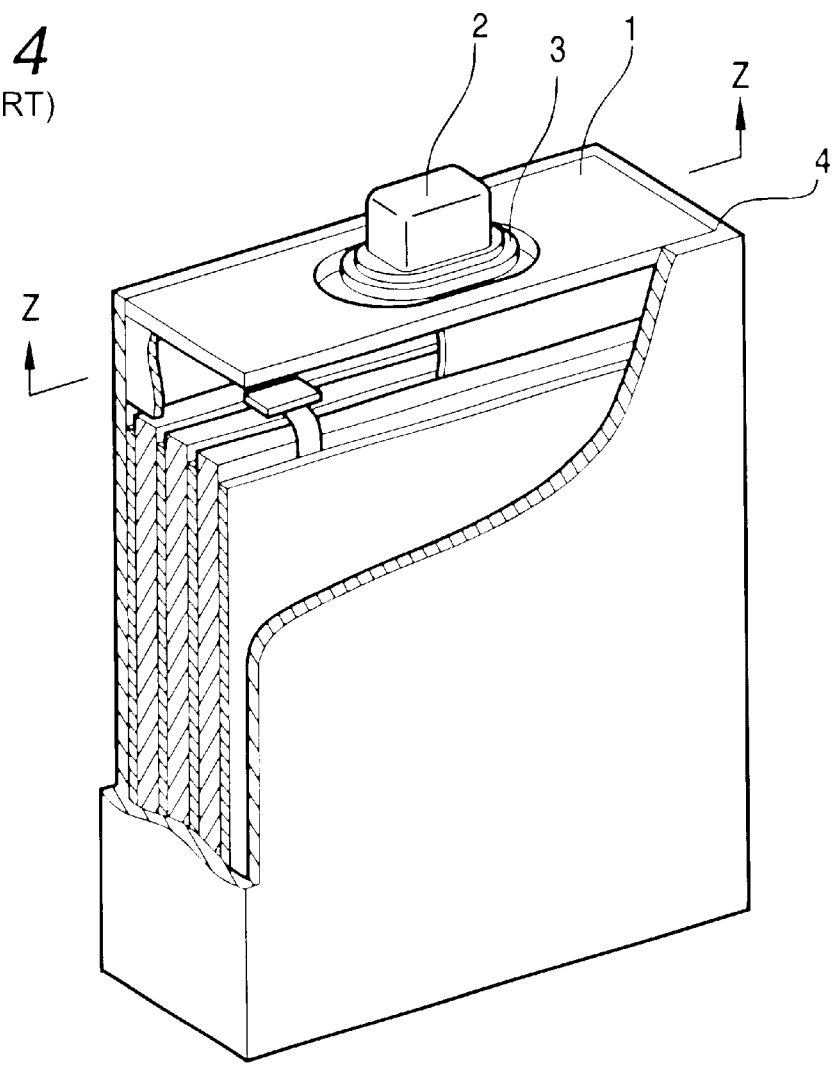
FIG. 4 illustrates a conventional rectangular battery.

The hermetically sealed rectangular battery of the first embodiment has as shown in FIGS. 1–3, a positive electrode terminal 2 disposed on the wide side of a metallic can 20.
(Preparation of positive electrode plate)

90 parts by weight of nickel hydroxide powder containing 2.% by weight of zinc and 1% by weight of cobalt as coprecipitating components, 10 parts by weight of cobalt hydroxide, 3 parts by weight of zinc oxide powder and 50 parts by weight of a 0.2 wt-% aqueous solution of hydroxypropyl cellulose were kneaded to prepare an active positive electrode material paste. The active material paste thus prepared was then packed into expanded nickel having a thickness of about 1.6 mm, dried, rolled, and then cut to prepare three sheets of a positive electrode plate having a size of 30 mm×38 mm×0.8 mm.
(Preparation of negative electrode plate)

A mishmetal (mixture of rare earth elements such as La, Ce, Nd and Pr), nickel, cobalt, aluminum and manganese were measured out in predetermined weights, mixed, put into a crucible, melted in a high frequency smelting furnace; and then cooled to prepare a hydrogen-absorbing alloy ingot represented by the composition formula $MmNi_{3.4}Co_{0.8}Al_{0.2}Mn_{0.6}$ which is then ground in an inert gas to an average particle diameter of 50 μm To the hydrogen-absorbing alloy powder thus prepared was then added a polyethylene oxide powder as a binder. To the mixture was then added ion-exchanged water. The mixture was then kneaded to prepare a paste-like slurry. The added amount of the polyethylene oxide powder as a binder was 0.5% by weight based on the weight of the hydrogen-absorbing alloy.

The hydrogen-absorbing alloy slurry thus prepared was then applied to the both surfaces of a core material made of a punching metal in such a manner that the core material was exposed at the central part thereof to prepare a hydrogen-absorbing alloy negative electrode. Thus, two sheets of negative electrode plates having a size of 30 mm×78 mm×0.4 mm were prepared.
(Preparation of hermetically sealed rectangular metal-hydride storage battery)

The negative electrode plate consisting of two parts thus prepared was then bent at the central exposed portion (active material-uncoated portion) into a U-shaped form. Two sheets of the positive electrode plates were then sandwiched by the two parts of the negative electrode plate connected to each other through the U-shaped bend with a separator made of nonwoven polypropylene cloth having a thickness of about 0.15 mm provided interposed therebetween. A sheet of the positive electrode plate was then laminated between two sets of the U-shaped negative electrode plate having the positive electrode plates incorporated therein with a separator made of nonwoven polypropylene cloth having a thickness of about 0.15 mm provided interposed therebetween to prepare a group of electrode plates. The group of electrode plates thus prepared was then inserted into a metallic can having an opening formed on one of the two wide sides 5 in such an arrangement that the direction of lamination of the group of electrode plates is perpendicular to the wide side 5. An electrolytic solution was then injected into the metallic can. The metallic can was then sealed by laser-welding a sealing plate shown in FIG. 2 thereto to prepare 1,000 samples of a hermetically sealed rectangular nickel-hydrogen storage battery A having a nominal capacity of 1,650 mAh and a size of 33 mm wide×48 mm high×6.0 mm thick of the invention.

FIG. 2 is a front view illustrating the sealing plate used in the hermetically sealed rectangular nickel-hydrogen storage battery of the invention. The sealing plate 1 has a positive electrode terminal 2 and a gasket 3 for insulating the positive electrode terminal 2 from the sealing plate and rendering the battery airtight.

FIGS. 3(a) and (b) are front and longitudinal sectional views of the hermetically sealed rectangular nickel-hydrogen storage battery of the invention, respectively. The reference numeral 1 indicates a sealing material, the reference numeral 2 indicates a positive electrode terminal, the reference numeral 3 indicates a gasket for insulating the sealing material from the positive electrode terminal, the reference numeral 4 indicates a laser-welded portion, and the reference numeral 5 indicates the wide side of a metallic can.

The metallic can is then irradiated with laser beam at the laser-welded portion so that a sealing plate 1 comprising a horizontal portion 1a provided with the positive electrode terminal 2 and vertical portions 1b and 1c formed by bending the horizontal portion 1a upwardly and downwardly at right angle, respectively, is laser-welded to the wide side 5 of the rectangular can 5 shown in FIGS. 3(a) and 3(b) to seal the battery.

COMPARATIVE EXAMPLE 1

Figure 5:
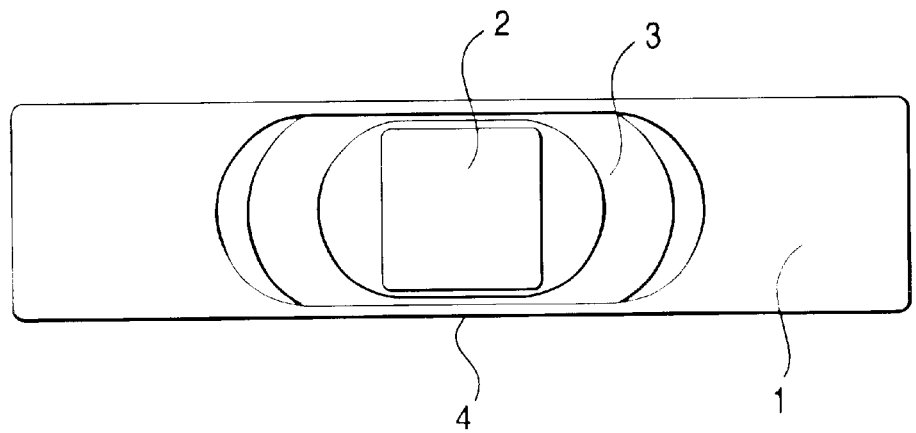
FIG. 5 illustrates a sealing plate used in the conventional rectangular battery.

A group of electrode plates was prepared in the same manner as in Example 1. The group of electrode plates thus prepared was then inserted into a metallic can having an opening formed on the upper side thereof in such an arrangement that the direction of lamination of the group of electrode plates is perpendicular to the wide side 4 of the metallic can. An electrolytic solution was then injected into the metallic can. The sealing plate shown in FIG. 5 was placed on the opening formed on the upper side of the metallic can, and then laser-welded to the metallic can to prepare 1,000 samples of a hermetically sealed rectangular nickel-hydrogen storage battery X having a nominal capacity of 1,650 mAh and a size of 33 mm wide×48 mm high×6.0 mm thick of comparative example.

Experiment 1

The hermetically sealed rectangular nickel-hydrogen storage battery A of the invention and the hermetically sealed rectangular nickel-hydrogen storage battery X of comparative example thus prepared were then subjected to electrolyte leakage test under the following conditions. The results are set forth in Table 1.

(Test)

Storage temperature: Room temperature (20–25° C.)

Storage time: 1 month

Examination method: The laser-welded portion and the gasket portion were visually observed to judge electrolyte leakage.

TABLE 1

|  | Prior art (comparative battery X) | Present invention (battery A of the invention) |
| --- | --- | --- |
| Number of samples showing electrolyte leakage | 2/1,000 | 0/1,000 |

As can be seen in Table 1 above, the battery A of the invention showed no defects due to electrolyte leakage while the comparative battery X showed defects due to electrolyte leakage at a ratio of 2 out of 1,000 samples. This is presumably because the comparative battery X has so small a distance between the laser-welded portion and the gasket that the gasket is melted during laser welding of the sealing material, causing the deterioration of the airtightness of the battery resulting in the occurrence of electrolyte leakage.

On the other hand, it can be thought that the battery A of the invention has a distance between the laser-welded portion and the gasket great enough to prevent the gasket from being melted during laser welding of the sealing material, keeping the battery airtight and hence inhibiting the occurrence of electrolyte leakage.

While as the sealing plate of the present example there was used one having a horizontal portion and vertical portions formed by bending the horizontal portion upwardly and downwardly, respectively, the sealing plate employable herein is not limited thereto. For example, a sealing plate having a positive electrode terminal having only a normal horizontal portion but free of upwardly and downwardly bent vertical portions may be laser-welded to the wide side of the metallic can.

While the present example has been described with reference to hermetically sealed rectangular nickel-hydrogen storage battery, the present invention is not limited thereto. The present invention can be applied to all the types of rectangular batteries which are sealed by irradiation with laser beam such as hermetically sealed rectangular nickel-cadmium storage battery, hermetically sealed rectangular lithium battery and hermetically sealed rectangular lithium-ion battery.

While the invention has been described with reference to hermetically sealed rectangular battery having a thickness of 6.0 mm, the invention is not limited thereto. The invention can be applied to hermetically sealed rectangular battery having a thickness of 6.0 mm or less, e.g., 5.0 mm. Thus, further reduction of the thickness of hermetically sealed rectangular battery can be accomplished.

As made obvious from the foregoing description, the hermetically sealed rectangular battery of the invention is not liable to melting of the gasket for insulating the positive electrode terminal from the sealing material during laser welding of the sealing material to the metallic can, making it possible to provide a hermetically sealed rectangular battery which can be kept airtight and is not liable to occurrence of electrolyte leakage. At the same time, further reduction of the thickness of hermetically sealed rectangular battery can be accomplished. Thus, the invention has an extremely high industrial value.

What is claimed is:

1. A hermetically sealed rectangular battery comprising a group of electrode plates received in a metallic can having a pair of opposing wide sides and a pair of opposing narrow sides, said group of electrode plates having a positive electrode plate and a negative electrode plate laminated on each other with a separator provided interposed therebetween, wherein said metallic can is provided with a terminal which connects with one of said positive electrode plate and negative electrode plate and is disposed on a wide side of the metallic can, and wherein said metallic can is connected with the other of said positive electrode plate and negative electrode plate.

2. A hermetically sealed rectangular battery, according to claim 1, wherein the terminal is mounted on a sealing plate of said metallic can.

3. A hermetically sealed rectangular battery, according to claim 2, wherein the terminal is mounted through a gasket on the sealing plate.

4. A hermetically sealed rectangular battery, according to claim 2, wherein the sealing plate is mounted on a recess formed on the wide side of said metallic can.

5. A hermetically sealed rectangular battery, according to claim 2, wherein the sealing plate comprises:

a main sealing body portion to which the terminal is mounted, said main sealing body portion being mounted on a recess formed in the wide side of said metallic can so as to be disposed in parallel with the wide side;

a first sealing portion extending in a first direction from one side edge of the main sealing body portion, said first direction being perpendicular to a plane of the main sealing body portion; and a second sealing portion extending in a second direction from an opposite side edge of the main sealing body portion, said second direction being perpendicular to a plane of the main sealing body portion and extending in an opposite direction to said first direction, and free end edges of said main sealing body portion, said first sealing portion and said second sealing portion are sealed with said metallic can.

6. A hermetically sealed rectangular battery, according to claim 5, wherein said sealing plate and said metallic can are sealed with each other by laser welding.

7. A hermetically sealed rectangular battery, according to claim 2, wherein said hermetically sealed rectangular battery is a hermetically sealed rectangular alkali storage battery.

8. A hermetically sealed rectangular battery, according to claim 7, wherein said hermetically sealed rectangular battery is a hermetically sealed rectangular nickel-hydrogen storage battery.

9. A hermetically sealed rectangular battery, according to claim 7, wherein said hermetically sealed rectangular battery is a hermetically sealed rectangular nickel-cadmium storage battery.

10. A hermetically sealed rectangular battery, according to claim 2, wherein said hermetically sealed rectangular battery is a hermetically sealed rectangular lithium battery.

11. A hermetically sealed rectangular battery, according to claim 2, wherein said hermetically sealed rectangular battery is a hermetically sealed rectangular lithium ion secondary battery.

12. A hermetically sealed rectangular battery comprising a group of electrode plates received in a metallic can having a pair of opposing wide sides and a pair of opposing narrow sides, said group of electrode plates having a positive electrode plate and a negative electrode plate laminated on each other with a separator provided interposed therebetween, wherein said metallic can is provided with a terminal which connects with an electrode plate of one of said positive electrode plate and negative electrode plate, wherein the terminal is mounted on a sealing plate of said metallic can, and wherein the sealing plate is mounted on a recess formed on a wide side of said metallic can.

13. A hermetically sealed rectangular battery, according to claim 12, wherein the sealing plate comprises:

a main sealing body portion to which the terminal is mounted, said main sealing body portion being mounted on a recess formed in the wide side of said metallic can so as to be disposed in parallel with the wide side;

a first sealing portion extending in a first direction from one side edge of the main sealing body portion, said first direction being perpendicular to a plane of the main sealing body portion; and a second sealing portion extending in a second direction from an opposite side edge of the main sealing body portion, said second direction being perpendicular to a plane of the main sealing body portion and extending in an opposite direction to said first direction, and free end edges of said main sealing body portion, said first sealing portion and said second sealing portion are sealed with said metallic can.

14. A hermetically sealed rectangular battery comprising a group of electrode plates received in a metallic can having a pair of opposing wide sides and a pair of opposing narrow sides, said group of electrode plates having a positive electrode plate and a negative electrode plate laminated on each other with a separator provided interposed therebetween, wherein said metallic can is provided with a terminal which connects with an electrode plate of one of said positive electrode plate and negative electrode plate and is disposed on a wide side of the metallic can, wherein the terminal is mounted on a sealing plate of said metallic can, and wherein said hermetically sealed rectangular battery is one of a hermetically sealed rectangular alkali storage battery, a hermetically sealed rectangular lithium battery, and a hermetically sealed rectangular lithium ion secondary battery.

15. A hermetically sealed rectangular battery, according to claim 14, wherein said hermetically sealed rectangular battery is a hermetically sealed rectangular nickel-hydrogen storage battery.

16. A hermetically sealed rectangular battery, according to claim 14, wherein said hermetically sealed rectangular battery is a hermetically sealed rectangular nickel-cadmium storage battery.

17. A hermetically sealed rectangular battery, comprising:

a metallic can having a pair of opposing wide sides, a pair of opposing narrow sides and an opening portion;

a group of electrode plates received in said metallic can, including a positive electrode plate and a negative electrode plate laminated on each other with a separator provided interposed therebetween;

a sealing plate which seals said opening portion of the metallic can and is disposed in parallel with the wide side of the can;

a terminal which connects with one of said positive electrode plate and negative electrode plate and is disposed on said sealing plate.

18. A hermetically sealed rectangular battery, according to claim 17, wherein the terminal is mounted through a gasket on the sealing plate, and said metallic can is connected with the other of said positive electrode plate and negative electrode plate.

19. A hermetically sealed rectangular battery, according to claim 17, wherein the sealing plate is mounted on a recess formed on the wide side of said metallic can.

20. A hermetically sealed rectangular battery, according to claim 17, wherein the sealing plate comprises:

a main sealing body portion to which the terminal is mounted, said main sealing body portion being mounted on a recess formed in the wide side of said metallic can so as to be disposed in parallel with the wide side;

a first sealing portion extending in a first direction from one side edge of the main sealing body portion, said first direction being perpendicular to a plane of the main sealing body portion; and a second sealing portion extending in a second direction from an opposite side edge of the main sealing body portion, said second direction being perpendicular to a plane of the main sealing body portion and extending in an opposite direction to said first direction, and free end edges of said main sealing body portion, said first sealing portion and said second sealing portion are sealed with said metallic can.

21. A hermetically sealed rectangular battery, according to claim 17, wherein said hermetically sealed rectangular battery is one of a hermetically sealed rectangular alkali storage battery, a hermetically sealed rectangular lithium battery, and a hermetically sealed rectangular lithium ion secondary battery.

* * * * *